Jan. 24, 1956   G. E. NEWBERRY   2,731,655
GREASE FITTING CLEANER
Filed April 29, 1952
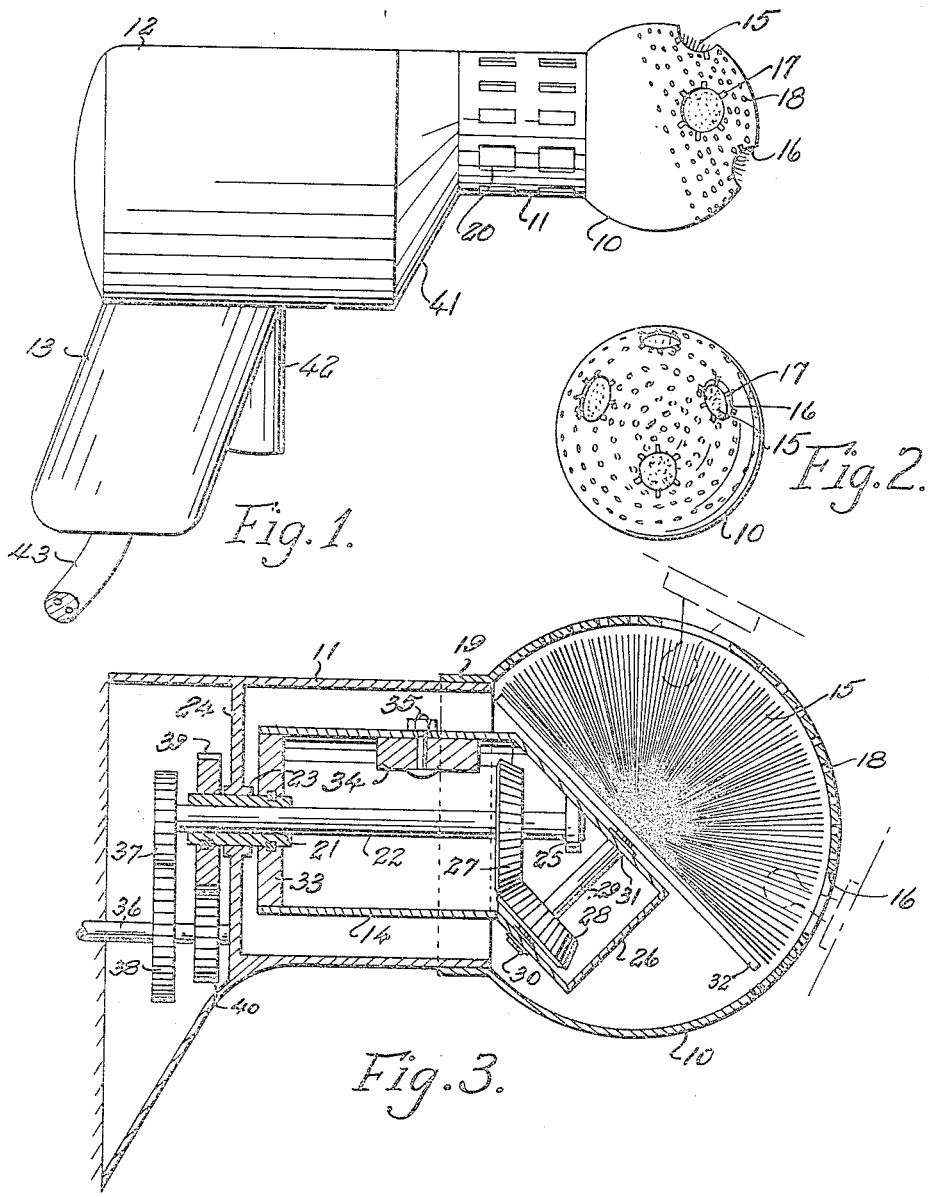
INVENTOR.
GEORGE E. NEWBERRY
BY Victor J. Evans & Co.
ATTORNEYS

2,731,655

GREASE FITTING CLEANER

George E. Newberry, Ruth, Ky.

Application April 29, 1952, Serial No. 284,905

4 Claims. (Cl. 15—22)

This invention relates to portable motor driven brushes for use in cleaning around machinery and the like, and in particular a substantially spherical casing carried by the end of a sleeve extended from a motor housing with grease fitting receiving openings in the casing wherein with the casing positioned over a grease fitting a rotating brush positioned in the casing and journaled in the motor housing is adapted to brush grease, dirt, and the like from grease fittings extended through the openings and into the casing.

The purpose of this invention is to provide a brush cleaning device that is adapted to be carried to and positioned over the grease fittings on a part of a machine whereby it is only necessary to position the device over the fitting to clean the fitting.

Various types of brushes have been mounted on comparatively small motor housings and brushes of this type have been used for various purposes, however, because of the comparatively inaccessible places in which grease fittings are positioned it is difficult to clean completely around the grease fittings with a conventional rotating brush. With this thought in mind this invention contemplates a grease fitting cleaner that is positioned over a grease fitting and that is provided with a rotating brush that travels around the fitting thereby completely cleaning the fitting without moving the housing.

The object of this invention is, therefore, to provide means for forming a grease fitting cleaner whereby the device is placed over a grease fitting with the fitting in position upon a machine and a small brush in the device brushes grease, dirt, and the like from all sides of the fitting.

Another object of the invention is to provide a device for brushing completely around a grease fitting with the grease fitting in position upon a machine in which means is provided for scraping hard grease positioned around the fitting to facilitate positioning the device upon the fitting.

A further object of the invention is to provide a grease fitting cleaner that travels completely around the fitting in the cleaning operation in which the cleaner is of a comparatively simple and economical construction.

With these and other objects and advantages in view the invention embodies a motor housing having a sleeve with a gear casing positioned to rotate therein extended from one end of the housing and with a spherical casing having a rotating brush carried by the end of the gear casing and positioned to rotate around the interior thereof therein, whereby grease fittings extended through openings in the spherical casing are cleaned by the brush.

Other features and advantages of the invention will appear from the following description taken in connection with the drawings, wherein:

Figure 1 is a side elevational view illustrating the improved grease fitting cleaner.

Figure 2 is an end elevational view showing the spherical casing at the end of the cleaner with the motor housing omitted.

Figure 3 is a longitudinal section through the spherical casing and mounting sleeve showing the brush and gear housing and in which the parts are shown on an enlarged scale.

Referring now to the drawing wherein like reference characters denote corresponding parts the improved grease fitting cleaner of this invention includes a spherical casing 10, a sleeve 11, a motor housing 12 having a handle 13, a rotating gear case 14 positioned in the sleeve and a brush 15 carried by the end of the gear case and positioned to travel around the interior of the casing 10.

As illustrated in the drawing the casing 10 is provided with openings 16 having radially disposed slots 17 extended from the edges whereby with an opening positioned over a grease fitting the slots cut grease around the fitting.

The casing 10 is also provided with perforations 18 to permit circulation of air through the casing and these openings are positioned to be cleaned by the brush continuously. The casing 10 is also provided with a flange 19 by which the casing is mounted on the end of the sleeve 11.

The sleeve 11 is provided with openings 20 through which dirt and the like may escape to prevent dirt and grease accumulating around the gear case 14.

The gear case 14 is carried by a bearing sleeve 21 that is journaled on a shaft 22, the sleeve being rotatably held in a bearing 23 in a web 24 which provides a dividing partition between the sleeve 11 and motor housing 12.

The extended end of the shaft 22 is journaled in a bearing 25 in an offset section 26 of the gear case and a beveled gear 27 on the shaft meshes with the gear 28 on a shaft 29 on the extended end of which the brush 15 is carried. The shaft 29 is journaled in bearings 30 and 31 in the offset section 26 of the gear case and the brush is provided with a backing plate 32, the size of which is such that the plate will pass through the flange 19 of the casing 10 to facilitate cleaning.

The gear case 14, which is formed with a tubular sleeve having a head 33 in the end positioned on the sleeve 21, is provided with a counterweight 34 that is secured in position with a bolt 35. The size and position of the counterweight are such that the weight provides a counter balance for the gears in the offset section of the gear case.

The brush rotating shaft 22 is driven from a shaft 36 extended from the motor with gears 37 and 38 and the sleeve 21, upon which the gear case 14 is carried is rotated from the motor shaft with gears 39 and 40.

The sleeve 11 is mounted on the motor housing 12 with an intermediate section 41 and the housing may be provided with a trigger 42 that is adapted to close the switch to complete a circuit to the motor.

Power may be supplied to the motor through an electric cord 43, that may extend through the handle as shown in Fig. 1.

With the parts arranged in this manner the gear case 14 rotates, carrying the brush 15 around the interior of the casing 10 and at the same time the brush rotates at a higher speed, the shaft 29 being rotated by the gears 27 and 28 and the shaft 22 by the gears 37 and 38; and the gear 38 being larger than the gear 40, causes the brush to rotate at a higher speed than that of the gear case.

It will be understood that modifications within the scope of the appended claims may be made in the design and arrangement of the parts without departing from the spirit of the invention.

What is claimed is:

1. A grease fitting cleaner comprising a motor housing, a sleeve carried by said motor housing and extended outwardly therefrom, a substantially spherical casing having grease fitting receiving openings therein carried by and extended outwardly from the sleeve, a gear casing journaled in the motor housing and extended into the casing, means in the housing connected to said gear case for rotating said gear case, a brush journaled in the extended end of the gear case at an angle to the axis of rotation of said gear case, the rotation of the gear case carrying the brush around the interior of the casing, and means in the gear casing coacting with the means for rotating the gear casing for rotating the brush on the gear casing as the gear casing is rotated.

2. In a grease fitting cleaner, the combination which comprises a motor housing, a sleeve having openings therein carried by the motor housing, a spherical brush casing carried by the extended end of the sleeve, a gear case journaled ni the motor housing and extended into the brush casing, a motor shaft extended from the motor housing, means rotating the gear case from the motor shaft, a brush journaled on the extended end of the gear case at an angle to the axis of rotation of said gear case, and means in the gear casing coacting with the means for rotating the gear casing for rotating the brush through the said gear case as the gear casing is rotated, said brush casing having spaced openings with radially disposed slots extended from the edges thereof in the wall thereof.

3. In a grease fitting cleaner, the combination which comprises a motor housing, a sleeve having openings therein carried by the motor housing, a spherical brush casing carried by the extended end of the sleeve, a gear case journaled in the motor housing and extended into the brush casing, a motor shaft extended from the motor housing, means rotating the gear case from the motor shaft, a brush journaled on the extended end of the gear case at an angle to said gear case, and means in the gear casing coacting with the means for rotating the gear casing for rotating the brush through the said gear case as the gear casing is rotated, said brush casing having spaced openings with radially disposed slots extended from the edges thereof in the wall thereof, said brush casing also having perforations therein positioned between and around the openings and said motor housing having a starter trigger thereon.

4. In a motor brush, a motor housing, a first motor driven shaft journalled in said motor housing longitudinally thereof, a bearing sleeve journalled in the housing longitudinally thereon, a gear case fixed to said sleeve, a second shaft journalled in said gear casing and extending through the sleeve into the motor housing, a third shaft journalled in said gear casing at an angle to said second shaft and extending outwardly and beyond said gear case, a brush head fixed to the outer end of said third shaft, a gear train in said motor housing operatively connecting said second shaft to said first shaft and said first shaft to said sleeve and gears connecting said second shaft to said third shaft, whereby said brush head is rotatable about an axis coincident with the axis of said second shaft and rotatable about an axis coincident with the axis of said third shaft.

References Cited in the file of this patent

UNITED STATES PATENTS

| | | |
|---|---|---|
| 950,759 | Weiner | Mar. 1, 1910 |
| 1,467,874 | Muchow | Sept. 11, 1923 |
| 1,656,665 | Dehuff | Jan. 17, 1928 |
| 1,751,548 | Harber et al. | Mar. 25, 1930 |
| 1,928,390 | Myers | Sept. 26, 1933 |
| 2,300,138 | Steele | Oct. 27, 1942 |
| 2,306,622 | Gordon | Dec. 29, 1942 |
| 2,644,189 | Calvin | July 7, 1953 |